United States Patent [19]
Van Driel et al.

[11] Patent Number: 5,823,045
[45] Date of Patent: Oct. 20, 1998

[54] MEASURING BLOOD VOLUME IN SOFT-SHELL VENOUS RESEVOIRS BY DISPLACEMENT

[75] Inventors: Michael R. Van Driel, Fountain Valley, Calif.; Darren S. Gray, Grand Junction, Colo.; Victor C.H. Lam; Jill E. Uyeno, both of Honolulu, Hi.; Yu-Tung Wong, Huntington Beach, Calif.

[73] Assignee: Medtronic, Inc., Minneapolis, Minn.

[21] Appl. No.: 840,688

[22] Filed: Apr. 29, 1997

[51] Int. Cl.⁶ ............................................ G01F 23/00
[52] U.S. Cl. ............................................... 73/299
[58] Field of Search .................... 73/299, 302, 861.49, 73/861.46; 604/65, 66, 67; 128/DIG. 13, DIG. 14

[56] References Cited

U.S. PATENT DOCUMENTS

| | | | |
|---|---|---|---|
| 3,906,794 | 9/1975 | Shotmeyer | 73/302 X |
| 4,598,733 | 7/1986 | Kanno et al. | 73/299 X |
| 4,863,452 | 9/1989 | Irmiter et al. | 604/122 X |
| 5,043,707 | 8/1991 | Heinze | 128/DIG. 13 X |
| 5,382,227 | 1/1995 | Riquier | 128/DIG. 13 X |
| 5,563,584 | 10/1996 | Rader et al. | 128/DIG. 13 X |
| 5,573,526 | 11/1996 | Hess . | |

OTHER PUBLICATIONS

Cobe Corporation Product Specification; Appendix C, pp. 46 & 47; date unknown.

*Primary Examiner*—William L. Oen
*Attorney, Agent, or Firm*—Harry G. Weissenberger

[57] ABSTRACT

The blood volume in a soft-shell venous reservoir is measured by immersing the reservoir in a fluid and measuring the displacement of that fluid, either by measuring a liquid level in an overflow tube or by measuring the temperature-compensated gas pressure if the displaced fluid is a gas in a sealed container. Equipment operable from outside the container to measure the reservoir or to expel air therefrom is also disclosed.

12 Claims, 4 Drawing Sheets

MEASURING BLOOD VOLUME IN SOFT-SHELL VENOUS RESEVOIRS BY DISPLACEMENT

FIELD OF THE INVENTION

This invention relates to the measurement of the blood volume in a soft-shell venous reservoir of a heart-lung machine, and more particularly to a method and apparatus using the displacement of a fluid to track blood volume variations.

BACKGROUND OF THE INVENTION

Heart-lung machines conventionally include a venous reservoir which receives the patient's blood at a variable rate during open-heart surgery and releases it at a substantially steady rate to the oxygenation circuit from which it is returned to the patient. In the operation of the heart-lung machine, it is important for the perfusionist to be continuously advised of the exact volume of blood in the reservoir, as this information is needed to maintain the correct diluted blood volume in the patient and to calculate the proper doses of infused drugs.

Rigid hard-shell reservoirs lend themselves well to this purpose because accurate graduations can readily be inscribed on their surface. However, because the volume of the hard-shell reservoir itself is constant, it will discharge potentially lethal air into the blood circuit of the heart-lung machine if it is allowed to become empty.

Collapsible soft-shell reservoirs (i.e. plastic bags) have the advantage of increasing and reducing their volume in accordance with the amount of blood they contain, and they consequently need no airspace that could produce emboli. On the other hand, soft-shell reservoirs, because they are always exactly filled with blood, cannot provide a visible volume indication by way of graduations.

In the past, perfusionists have estimated the blood volume in soft-shell reservoirs by the appearance of the reservoir bag, but this requires experience and is not sufficiently accurate for modern requirements. To remedy this deficiency, it has previously been proposed to position the reservoir bag between two parallel plates which are biased against the bag, and whose distance from each other is indicated by a tape measure. That system, however, is not very accurate and is awkward to observe.

SUMMARY OF THE INVENTION

The present invention fills the above-described need by providing a fluid-filled sealed enclosure in which the reservoir bag is mounted. As the reservoir bag expands, it displaces the fluid (if the fluid is a liquid) or compresses the fluid (if the fluid is a gas). The displacement or pressure can be measured by conventional equipment and provides an accurate measure of the blood volume in the reservoir bag.

Because the bag is enclosed in this invention and is therefore inaccessible to the perfusionist, a way must be provided to massage any trapped air to the top of the bag so that it can be vented out of the bag. In accordance with the invention, this can be accomplished by vibration and by mechanical compression of the bag to vent any trapped air.

DESCRIPTION OF THE PREFERRED EMBODIMENT

Figure 1:
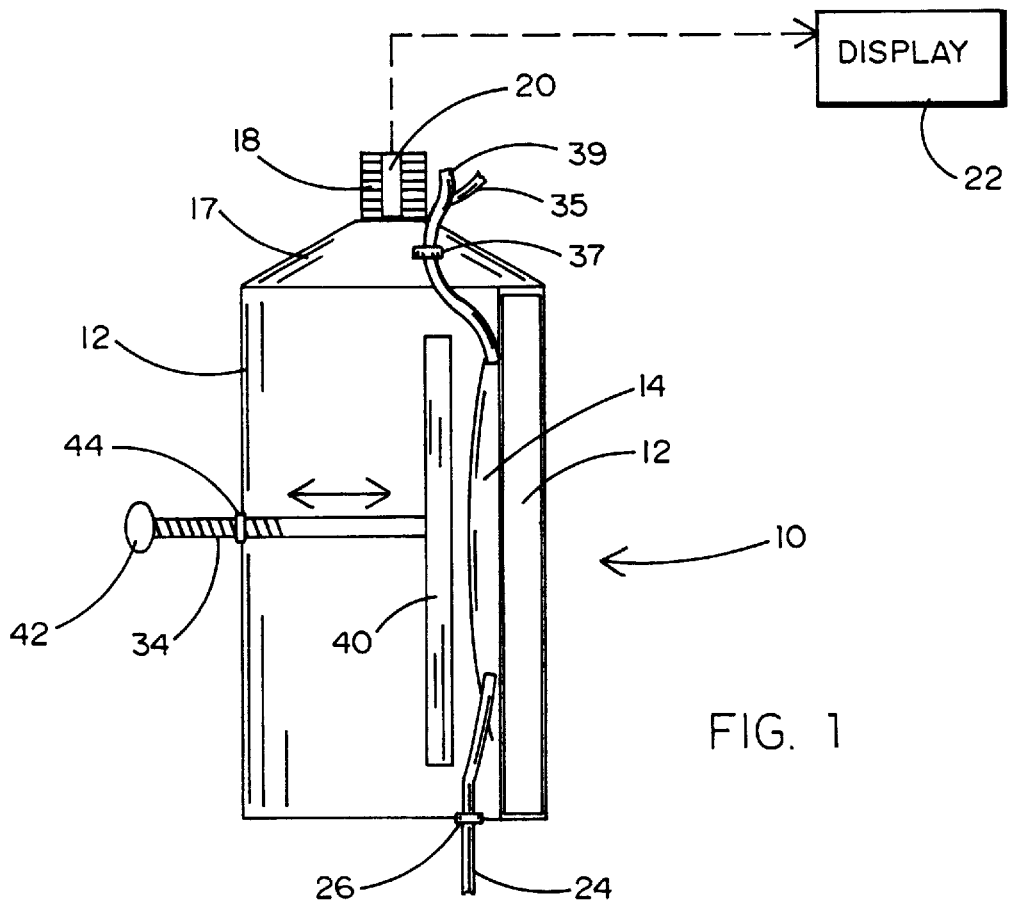
FIG. 1 is a side view of the container and reservoir bag of this invention.

As shown in FIG. 1, the system 10 of this invention includes a rigid container 12 in which a venous reservoir bag 14 is attached to a backplate 16. A riser 18 is mounted on the top of container 12 in communication therewith. A conventional liquid level detector 20 is mounted adjacent to the riser 18 so as to provide an indication of the level of liquid in the riser 18. This indication is translated into a volume measurement and is displayed, preferably digitally, on an appropriate display 22.

Figure 2:
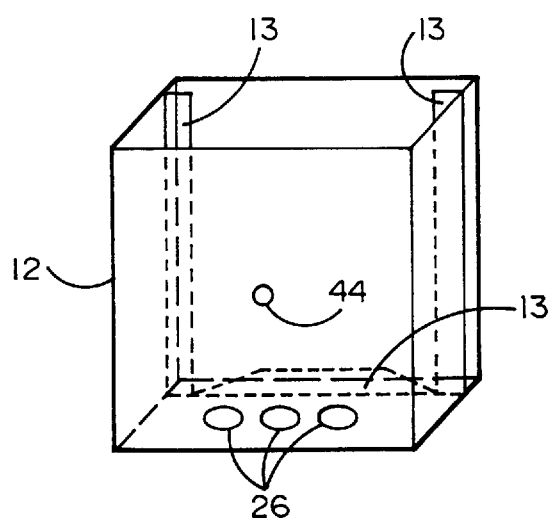
FIG. 2 is a schematic perspective view of the container of FIG. 1 of the invention.
Figure 3:
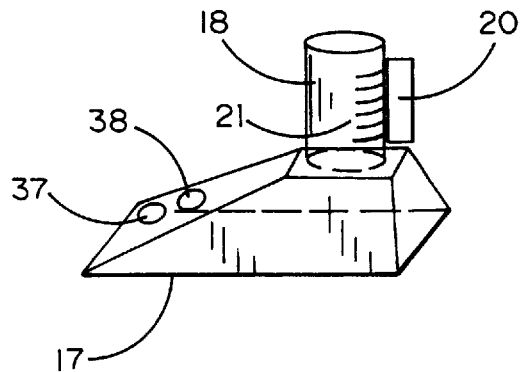
FIG. 3 is a schematic perspective view of one embodiment of the cover of the container of FIG. 2.
Figure 4:
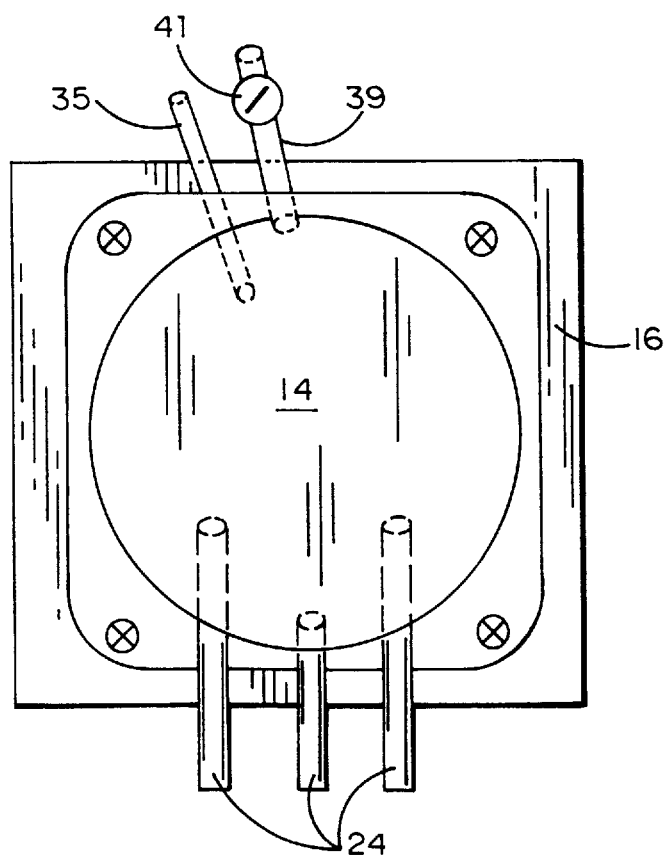
FIG. 4 is a front elevation of the reservoir and backplate used in the invention.

In use, a fully collapsed venous reservoir bag 14 is mounted on its holder 16 and inserted in the container 12. The connectors 24 of the bag 14 are threaded through resilient seals 26 in the bottom of container 12, while the medication line 35 and air vent 39 (FIG. 4) of the bag 14 are threaded through resilient seals 37, 38 (see FIG. 3) in the cover 17 of container 12 when the backplate 16 is inserted into the guides 13 (FIG. 2). The container 12 is then filled with saline solution until the saline solution rises into the riser 18 to the level at which the level detector 20 produces a reading of zero on the display 22.

If blood is now introduced into the bag 14 through the connectors 24, the bag 14 expands and displaces saline solution. The displaced solution causes the liquid level in riser 18 to rise and produce on display 22 a readout of the blood volume in bag 14. With commercially available ultrasonic level detectors such as Senix Corporation's UltraSensor, which can detect level changes of 0.1 mm, the riser 18 can be made as large in area as is convenient, so as to minimize the capillary effect of the riser walls. For example, in a typical container about 25 cm wide, 15 cm deep and 33 cm high, even a riser tube with a diameter of 15 cm would allow volume readings accurate to within about 2 ml—more than enough for practical applications.

Figure 6:
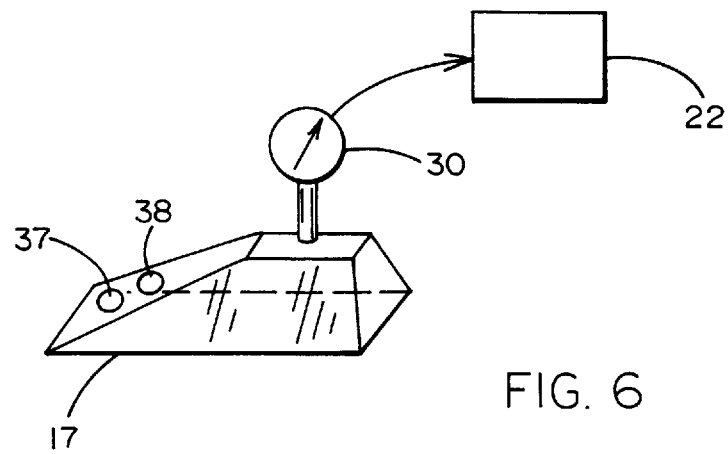
FIG. 6 is a schematic perspective view of another embodiment of the cover of the container of FIG. 2.

FIG. 6 shows a version of the cover 17 useful in an alternative embodiment of the invention, in which the fluid in container 12 is a gas such as air or nitrogen. The container 12 in this embodiment is gas-tight. A pressure and temperature gage 30 is connected to read the gas pressure and temperature in the container 12, and convey a temperature-corrected pressure reading to the display 22 for translation and display as volume. With the bag 14 fully collapsed, the gage 30 is set to produce a zero reading. When blood is introduced into the bag 14, the expansion of the bag compresses the gas in container 12 essentially linearly with the increase in bag volume. Inasmuch as gas pressure is also a linear function of temperature, the reading of pressure gage 30 needs to be corrected as a function of temperature changes from the temperature at which the zero setting was made. The accuracy of this embodiment depends upon the sensitivity of the pressure gage 30, but a satisfactory accuracy can readily be achieved with commercially available gages.

In the use of a soft-shell venous reservoir bag, the perfusionist typically taps the bag to encourage air bubbles in the stored blood to move to the top of the bag, away from the connectors through which the blood flows. Because the bag 14 in the system 10 of this invention is inaccessible from the outside of the container 12, it is desirable to provide an externally operable massaging device. In accordance with one aspect of the invention, one such device is shown in FIG. 7.

Figure 7:
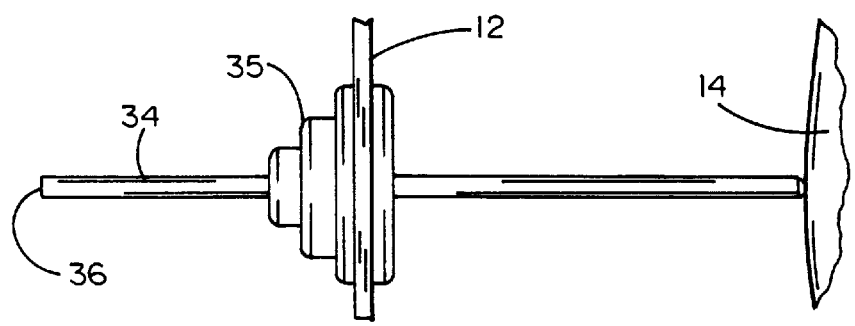
FIG. 7 is a schematic representation of a vibrating device for massaging the reservoir bag.

The massager 32 of FIG. 7 consists of a rod 34 whose end carries a vibrator 36. The rod 34 protrudes through an accordion fitting 35 or other movable seal, and is journalled in the wall of the container 12, so as to be movable inwardly and outwardly of the container 12, as well as swivelable in any direction about a pivot point in the wall of container 12. In this manner, vibration can be applied to any part of the bag 14.

Regarding still another aspect of the invention, it is customary for the venous reservoir bag 14 to have a closable vent 37 at its top. If a significant amount of air accumulates at the top of the bag 14, the perfusionist can bleed it off by opening the stopcock 41. For this purpose, it is necessary to squeeze the bag 14 until the blood in it fills the whole interior of the bag 14 and drives all the air out.

Figure 5A:
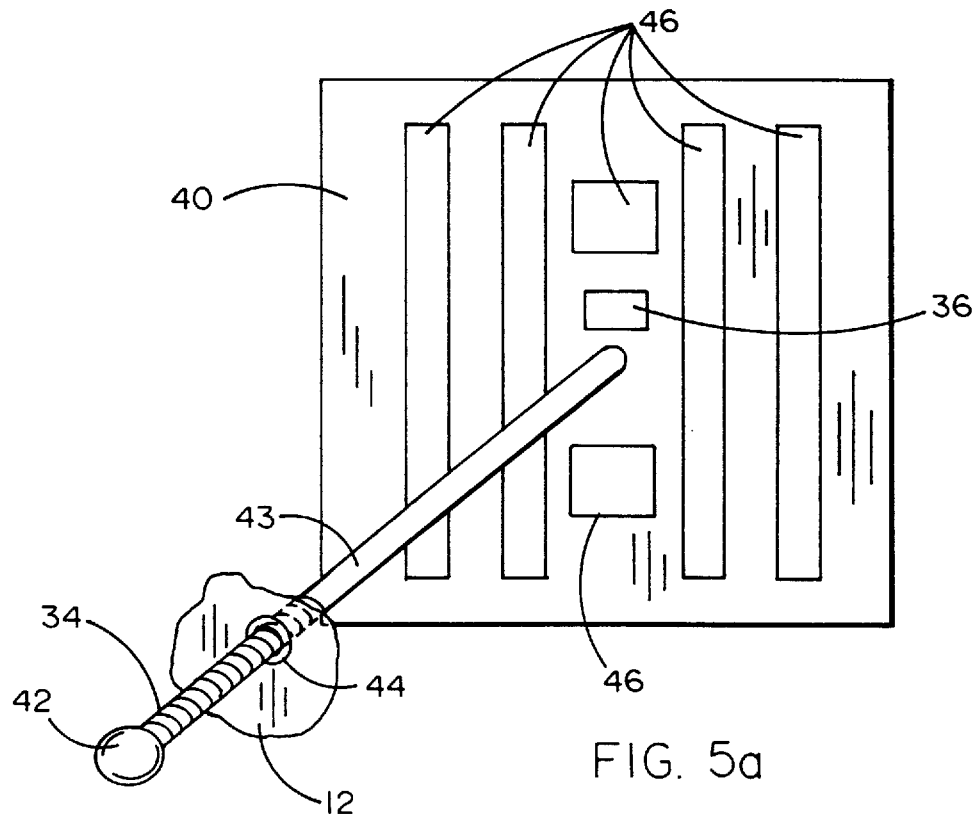
FIGS. 5a and 5b are perspective and side views, respectively, of a bag squeezing mechanism useful in the invention.
Figure 5B:
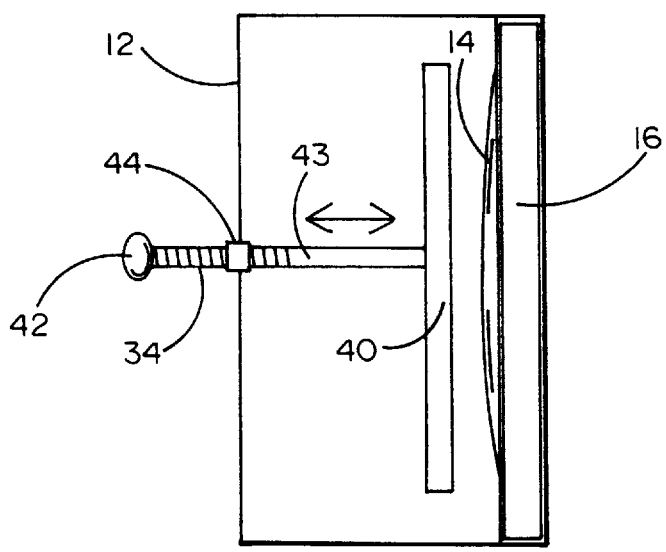

Inasmuch as the bag 14 is not accessible from the outside of the container 12, a plate 40 is mounted inside the container 12 for movement toward and away from the bag 14. The plate 40 can be so moved (See FIGS. 5a and 5b) by turning a screwthreaded rod 43 operable by a knob 42. The inner end of the rod 43 is rotatably attached to the plate 40, and the rod 43 is journalled in a fluid-tight screwthreaded bushing 44 in the wall of container 12. Alternatively, a sliding rod may be substituted for the screwthreaded rod 43. Thus, the bag 14 can be selectively squeezed between the plate 40 and the holder 16.

The plate 40 may be provided with wide cutouts 46 both to facilitate its movement through the saline solution of FIG. 1, and to allow the massager 34 of FIG. 7 to be applied to the bag 14.

Preferably, all components of the system 10 are fabricated from a transparent plastic material, so that the bag 14 and the other components of the system 10 can be continuously observed.

It is understood that the exemplary measuring of blood volume in soft-shell venous reservoirs by fluid displacement described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

We claim:

1. A method of measuring the blood volume in an expandable soft-shell venous reservoir, comprising the steps of:
   a) mounting said reservoir in a body of fluid;
   b) detecting a volume change in said fluid as said reservoir expands and contracts; and
   c) providing a blood volume indication corresponding to said detected volume changes.

2. The method of claim 1, in which said fluid is a liquid filling a container, said container having an overflow tube, and said volume change is detected by detecting the level of said liquid in said overflow tube.

3. The method of claim 1, in which said fluid is a gas filling a sealed container, and said volume change is detected by detecting a change in the pressure of said gas.

4. A method of measuring the blood volume in an expandable soft-shell venous reservoir, comprising the steps of:
   a) mounting said reservoir in a body of fluid;
   b) detecting a volume change in said fluid as said reservoir expands and contracts; and
   c) providing a blood volume indication corresponding to said detected volume changes, said detected pressure change being compensated for temperature.

5. A system for measuring blood volume in an expandable soft-shell venous reservoir, comprising:
   a) a liquid-filled container;
   b) a soft-shell venous reservoir disposed in said container;
   c) an overflow tube on said container, said overflow tube communicating with the interior of said container so as to reversibly store liquid displaced from said container;
   d) a sensor arranged to sense the liquid level in said overflow tube, and to produce a signal representative thereof; and
   e) apparatus for computing and displaying the blood volume in said venous reservoir in response to said signal.

6. A system for measuring blood volume in an expandable soft-shell venous reservoir, comprising:
   a) a liquid-filled container;
   b) a soft-shell venous reservoir disposed in said container;
   c) an overflow tube on said container, said overflow tube communicating with the interior of said container so as to reversibly store liquid displaced from said container;
   d) a sensor arranged to sense the liquid level in said overflow tube, and to produce a signal representative thereof;
   e) apparatus for computing and displaying the blood volume in said venous reservoir in response to said signal; and
   f) comprising a vibrating device pivotably mounted in a wall of said container in fluid-tight relationship thereto, said vibrating device being movable toward and away from said venous reservoir from the outside of said container so as to selectively impart vibration to the surface of said reservoir.

7. A system for measuring blood volume in an expandable soft-shell venous reservoir, comprising:
   a) a liquid-filled container;
   b) a soft-shell venous reservoir disposed in said container;
   c) an overflow tube on said container, said overflow tube communicating with the interior of said container so as to reversibly store liquid displaced from said container;
   d) a sensor arranged to sense the liquid level in said overflow tube, and to produce a signal representative thereof;
   e) apparatus for computing and displaying the blood volume in said venous reservoir in response to said signal; and
   f) comprising a plate so movable into and out of contact with said reservoir as to selectively squeeze said reservoir to bleed air therefrom.

8. A system for measuring blood volume in an expandable soft-shell venous reservoir, comprising:
   a) a gas-tight container filled with a gas;
   b) a soft-shell venous reservoir disposed in said container;
   c) a pressure sensor arranged to measure the pressure of said gas and to provide a signal indicative of the pressure of said gas; and d) apparatus for computing and displaying the blood volume in said venous reservoir in response to said signal.

9. A system for measuring blood volume in an expandable soft-shell venous reservoir, comprising:

a) a gas-tight container filled with a gas;

b) a soft-shell venous reservoir disposed in said container;

c) a pressure sensor arranged to measure the pressure of said gas and to provide a signal indicative of the pressure of said gas;

d) apparatus for computing and displaying the blood volume in said venous reservoir in response to said signal;

e) a temperature sensor arranged to measure the temperature of said gas; and f) apparatus arranged to receive said pressure signal and correct it for temperature variations.

10. A system for measuring blood volume in an expandable soft-shell venous reservoir, comprising:

a) a gas-tight container filled with a gas;

b) a soft-shell venous reservoir disposed in said container;

c) a pressure sensor arranged to measure the pressure of said gas and to provide a signal indicative of the pressure of said gas;

d) apparatus for computing and displaying the blood volume in said venous reservoir in response to said signal; and e) a vibrating device pivotably mounted in a wall of said container in fluid-tight relationship thereto, said vibrating device being movable toward and away from said venous reservoir from the outside of said container so as to selectively impart vibration on the surface of said reservoir.

11. A system for measuring blood volume in an expandable soft-shell venous reservoir, comprising:

a) a gas-tight container filled with a gas;

b) a soft-shell venous reservoir disposed in said container;

c) a pressure sensor arranged to measure the pressure of said gas and to provide a signal indicative of the pressure of said gas;

d) apparatus for computing and displaying the blood volume in said venous reservoir in response to said signal; and e) a plate so movable into and out of contact with said reservoir as to selectively squeeze said reservoir to bleed air therefrom.

12. The system of claim 5, in which said overflow tube has a cross-sectional area substantially smaller than the cross-sectional area of said container.

* * * * *